(12) United States Patent
Jun et al.

(10) Patent No.: US 11,683,475 B2
(45) Date of Patent: *Jun. 20, 2023

(54) METHOD AND APPARATUS FOR IMAGE ENCODING/DECODING

(71) Applicant: Electronics and Telecommunications Research Institute, Daejeon (KR)

(72) Inventors: Dong San Jun, Daejeon (KR); Jung Won Kang, Daejeon (KR); Sung Chang Lim, Daejeon (KR); Hyun Suk Ko, Daejeon (KR); Jin Ho Lee, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 106 days.

This patent is subject to a terminal disclaimer.

(21) Appl. No.: 17/315,637

(22) Filed: May 10, 2021

(65) Prior Publication Data

US 2021/0266528 A1 Aug. 26, 2021

Related U.S. Application Data

(63) Continuation of application No. 16/868,075, filed on May 6, 2020, now Pat. No. 11,039,128, which is a
(Continued)

(30) Foreign Application Priority Data

Nov. 19, 2015 (KR) .................. 10-2015-0162670
Jul. 15, 2016 (KR) .................. 10-2016-0089728

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/147* (2014.11); *H04N 19/176* (2014.11); *H04N 19/573* (2014.11)

(58) Field of Classification Search
CPC .. H04N 19/105; H04N 19/119; H04N 19/147; H04N 19/176; H04N 19/573; H04N 19/103; H04N 19/107
(Continued)

(56) References Cited

U.S. PATENT DOCUMENTS

2007/0019728 A1* 1/2007 Koto .................... H04N 19/136
375/E7.199
2009/0034856 A1* 2/2009 Moriya ................ H04N 19/147
382/238
(Continued)

FOREIGN PATENT DOCUMENTS

CN 101742321 A 6/2010
CN 102172027 A 8/2011
(Continued)

OTHER PUBLICATIONS

International Search Report dated Feb. 13, 2017 in corresponding International Patent Application No. PCT/KR2016/013345 (3 pages in English and 3 pages in Korean).
Chen, Chun-Chi et al., "Generalized bi-prediction for inter coding", *Joint Video Exploration Team (JVET) of ITU-T SG 16 WP 3 and ISO/IEC JTC 1/SC 29/WG 11*, 3rd Meeting: Geneva, Switzerland, May 26-Jun. 1, 2016 (pp. 1-4).

*Primary Examiner* — Christopher S Kelley
*Assistant Examiner* — Asmamaw G Tarko
(74) *Attorney, Agent, or Firm* — NSIP Law

(57) ABSTRACT

The present invention provides a method and apparatus for encoding/decoding an image to enhance inter prediction. According to the present invention, the method includes: determining a first reference picture and a second reference picture of a current block; determining both a first reference block in the first reference picture and a second reference
(Continued)

block in the second reference picture; partitioning the current block into a plurality of sub blocks; and obtaining a prediction block of each of the sub blocks on the basis of reference candidate block index information of each of the sub blocks.

3 Claims, 11 Drawing Sheets

Related U.S. Application Data continuation of application No. 15/775,420, filed as application No. PCT/KR2016/013345 on Nov. 18, 2016, now Pat. No. 10,687,053.

(51) Int. Cl.
  *H04N 19/176* (2014.01)
  *H04N 19/147* (2014.01)
  *H04N 19/573* (2014.01)
(58) Field of Classification Search
  USPC .......................................................... 375/240
  See application file for complete search history.

(56) References Cited

U.S. PATENT DOCUMENTS

| | | | | |
|---|---|---|---|---|
| 2010/0118943 | A1* | 5/2010 | Shiodera | H04N 19/61 |
| | | | | 375/E7.246 |
| 2011/0150423 | A1 | 6/2011 | Na et al. | |
| 2012/0106645 | A1* | 5/2012 | Lin | H04N 19/577 |
| | | | | 375/E7.125 |
| 2013/0294522 | A1 | 11/2013 | Lim et al. | |
| 2014/0056357 | A1* | 2/2014 | Tanizawa | H04N 19/186 |
| | | | | 375/240.12 |

FOREIGN PATENT DOCUMENTS

| | | |
|---|---|---|
| CN | 103548356 A | 1/2014 |
| CN | 104937932 A | 9/2015 |
| KR | 10-2009-0012926 A | 2/2009 |
| KR | 10-0978465 B1 | 8/2010 |
| KR | 10-2011-0069740 A | 6/2011 |
| KR | 10-2011-0115987 A | 10/2011 |
| KR | 10-2012-0017407 A | 2/2012 |
| KR | 10-2014-0111232 A | 9/2014 |
| KR | 10-2015-0105264 A | 9/2015 |

* cited by examiner

METHOD AND APPARATUS FOR IMAGE ENCODING/DECODING

CROSS REFERENCE TO RELATED APPLICATIONS

This application is a continuation of application Ser. No. 16/868,075 filed on May 6, 2020, which is a continuation of application Ser. No. 15/775,420 having a 371(c) date of May 11, 2018, which is a U.S. National Stage Application of International Application No. PCT/KR2016/013345, filed on Nov. 18, 2016, which claims the benefit under 35 USC 119(a) and 365(b) of Korean Patent Application No. 10-2015-0162670, filed on Nov. 19, 2015, and Korean Patent Application No. 10-2016-0089728, filed on Jul. 15, 2016 in the Korean Intellectual Property Office, the entire disclosures of which are incorporated herein by reference for all purposes.

TECHNICAL FIELD

The present invention relates to a method and apparatus for encoding/decoding an image and, more particularly, to a method and apparatus for enhancing encoding/decoding efficiency by performing inter prediction.

BACKGROUND ART

Recently, broadcast services having high definition (HD) resolution have expanded nationwide and worldwide, and thus, many users are accustomed to high-resolution and high quality images. Therefore, many organizations have striven to develop next generation image devices. In addition, since the interest in HDTV and ultra high definition (UHD) having resolution four times higher than that of HDTV has increased, there is a need for higher resolution and a compression technology for high-definition images.

Image compression technology includes various techniques, such as an inter-prediction technique of predicting pixel values included in a current picture from previous or subsequent pictures of the current picture, an intra-prediction technique of predicting pixel values included in a current picture using pixel information in the current picture, a transform and quantization technique of compressing energy of a residual signal, and an entropy encoding technique of assigning a short code to a value with a high appearance frequency and assigning a long code to a value with a low appearance frequency. Image data may be effectively compressed by using such image compression technology, and may be transmitted or stored.

In conventional video encoding/decoding, when performing prediction on a current encoding/decoding target block, the number of alternative reference blocks is limited, such that it is difficult to enhance encoding/decoding efficiency of inter prediction.

DISCLOSURE

Technical Problem

The present invention has been proposed to solve the problems in the related art. The present invention is intended to propose a method and apparatus enhancing encoding/decoding efficiency of a current block by using at least one of a plurality of reference block candidates, in generating an inter-prediction block of a current encoding target block.

In addition, the present invention is intended to propose a method and apparatus generating an inter-prediction block for each sub block.

It is to be understood that technical problems to be solved by the present disclosure are not limited to the aforementioned technical problems and other technical problems which are not mentioned will be apparent from the following description to a person with an ordinary skill in the art to which the present disclosure pertains.

Technical Solution

In order to achieve the above object, according to one aspect of the present invention, there is provided a method for decoding an image, the method including: determining a first reference picture and a second reference picture of a current block; determining both a first reference block in the first reference picture and a second reference block in the second reference picture; partitioning the current block into a plurality of sub blocks; and obtaining a prediction block of each of the sub blocks on the basis of reference candidate block index information of each of the sub blocks.

According to another aspect, there is provided an apparatus for decoding an image, the apparatus including an inter-prediction unit determining a first reference picture and a second reference picture of a current block; determining both a first reference block in the first reference picture and a second reference block in the second reference picture on the basis of motion vector information; partitioning the current block into a plurality of sub blocks; and obtaining a prediction block of each of the sub blocks on the basis of reference candidate block index information of each of the sub blocks.

According to the method and apparatus for decoding an image, the reference candidate block index information may indicate at least one of the first reference block, the second reference block, or a third reference block generated on the basis of both the first reference block and the second reference block, and the prediction block of a sub block may be obtained on the basis of a sub reference block having a same position of the sub block in a reference block that is selected by the reference candidate block index information.

According to the method and apparatus for decoding an image, a partition direction when the current block is partitioned into the sub blocks may be determined depending on a partition shape of a coding block of the current block.

According to the method and apparatus for decoding an image, the number of sub blocks in the current block may be determined on the basis of information of the number of sub blocks.

According to the method and apparatus for decoding an image, the number of sub blocks in the current block may be determined to be equal to or less than a number indicated by the information of the number of sub blocks, depending on a partition shape of a coding block of the current block.

According to the method and apparatus for decoding an image, whether or not the current block is partitioned into the plurality of sub blocks may be determined depending on a partition shape of a coding block of the current block.

According to the method and apparatus for decoding an image, when the coding block is asymmetrically partitioned and the current block is one partition of the coding block, whether or not the current block is partitioned into the plurality of sub blocks may be determined depending on whether or not a size of the current block is larger than a size of another partition in the coding block.

According to the method and apparatus for decoding an image, the prediction block of a sub block may be obtained on the basis of a weighted sum of each of a plurality of reference blocks among the first reference block, the second reference block, or the third reference block.

According to still another aspect, there is provided a method for encoding an image, the method including: determining a first reference picture and a second reference picture of a current block; determining both a first reference block in the first reference picture and a second reference block in the second reference picture; determining a prediction block of each of a plurality of sub blocks relative to the current block partitioned into the sub blocks; and encoding reference candidate block index information of each of the sub blocks on the basis of the determined prediction block of each of the sub blocks.

According to yet still another aspect, there is provided an apparatus for encoding an image, the apparatus including: an inter-prediction unit determining a first reference picture and a second reference picture of a current block, determining both a first reference block in the first reference picture and a second reference block in the second reference picture, and determining a prediction block of each of a plurality of sub blocks relative to the current block partitioned into the sub blocks; and an entropy encoding unit encoding reference candidate block index information of each of the sub blocks on the basis of the determined prediction block of each of the sub blocks.

Here, the reference candidate block index information may indicate at least one of the first reference block, the second reference block, or a third reference block generated on the basis of both the first reference block and the second reference block, and the prediction block of a sub block may be obtained on the basis of a sub reference block having a same position of a sub block in a reference block that is selected by the reference candidate block index information.

According to the method and apparatus for encoding an image, the reference candidate block index information may indicate at least one of the first reference block, the second reference block, or a third reference block generated on the basis of both the first reference block and the second reference block, and the prediction block of a sub block may be determined on the basis of a sub reference block having a same position of the sub block in a reference block that is selected by the reference candidate block index information.

According to the method and apparatus for encoding an image, a partition direction when the current block is partitioned into the sub blocks may be determined depending on a partition shape of a coding block of the current block.

According to the method and apparatus for encoding an image, information of the number of sub blocks may be determined depending on a partition shape of the coding block of the current block so as to determine the number of sub blocks in the current block.

According to the method and apparatus for encoding an image, the prediction block of a sub block may be determined on the basis of a weighted sum of each of a plurality of reference blocks among the first reference block, the second reference block, or the third reference block.

It is to be understood that the foregoing summarized features are exemplary aspects of the following detailed description of the present invention without limiting the scope of the present invention.

Advantageous Effects

According to the present invention, it is possible to provide the method and apparatus for enhancing encoding/decoding efficiency of a current block by using at least one of a plurality of reference block candidates, in generating an inter-prediction block of a current encoding target block.

In addition, according to the present invention, it is possible to provide the method and apparatus for generating an inter-prediction block for each sub block.

Effects that may be obtained from the present invention will not be limited to only the above described effects. In addition, other effects which are not described herein will become apparent to those skilled in the art from the following description.

MODE FOR INVENTION

Figure 1:
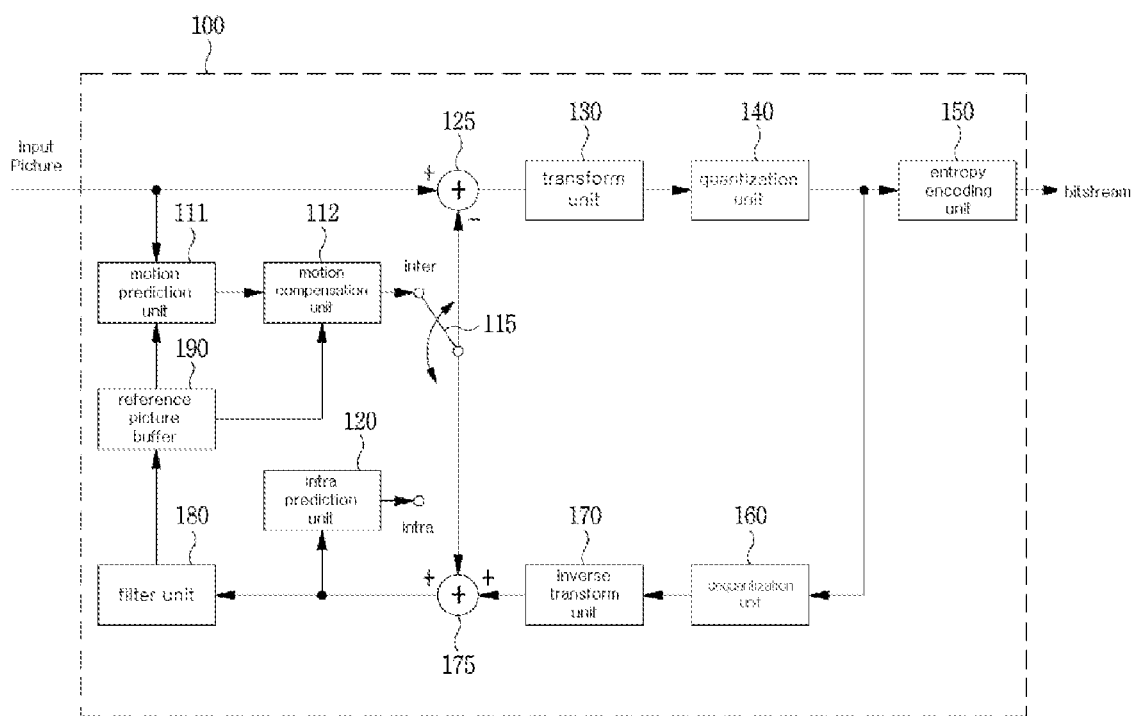
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim.

Terms used in the specification, 'first', 'second', etc. can be used to describe various components, but the components are not to be construed as being limited to the teams. The terms are only used to differentiate one component from other components. For example, the 'first' component may be named the 'second' component without being departed from the scope of the present invention and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

The following definitions are provided for specific terms that are used in the description.

An encoder may mean an apparatus performing encoding, and a decoder may mean an apparatus performing decoding.

Parsing may mean determination of a value of a syntax element by performing entropy decoding, or may mean the entropy decoding itself.

A block may mean samples of an M×N matrix. That is, the block may mean a sample matrix in a two-dimensional form. Here, M and N are positive integers.

A unit may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each of both the luma component block and the chroma component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

A reconstructed neighbor unit may mean a reconstructed unit that is previously spatially/temporally encoded or decoded, and the reconstructed unit is adjacent to an encoding/decoding target unit.

A unit depth may mean a partitioned degree of a unit. In a tree structure, a root node may be the highest node, and a leaf node may be the lowest node.

A symbol may mean a syntax element of the encoding/decoding target unit, a coding parameter, a value of a transform coefficient, etc.

In a structure of the bitstream, a portion related to header information may be referred to as a parameter set. The parameter set may include at least one of a video parameter set, a sequence parameter set, a picture parameter set, and an adaptation parameter set. In addition, the parameter set may include information of both a slice header and a tile header.

A bitstream may mean a bit string including encoded image information.

A coding parameter may mean information that is necessary to encode or decode an image. The coding parameter may include information, such as the syntax element, which is encoded by the encoder and is transmitted to the decoder, and may include information that may be derived in encoding or decoding processes. For example, the coding parameter may include at least one of an intra-prediction mode, an inter-prediction mode, an intra-prediction direction, motion information, a motion vector, a reference picture index, an inter-prediction direction, an inter-prediction indicator, a reference picture list, a motion vector predictor, a merge candidate, a type of transform, a size of transform, information about whether or not an additional transform is used, filter information within a loop, information about whether or not a residual signal is present, a quantization parameter, a context model, a transform coefficient, a transform coefficient level, a coded block pattern, a coded block flag, image display/output order, slice information, tile information, a picture type, information about whether or not the merge mode is used, information about whether or not the skip mode is used, a block size, a block depth, block partition information, a unit size, a unit depth, and the value of the unit partition information, etc. or the statistics thereof or both.

A prediction unit may mean a basic unit when performing inter prediction or intra prediction, and compensation for the prediction. The prediction unit may be partitioned into a plurality of partitions. When the prediction unit is partitioned into the plurality of partitions, each of the plurality of partitions may be a basic unit when performing the predictions and the compensation. Therefore, each partition partitioned from the prediction unit may be a prediction unit. In addition, one prediction unit may be partitioned into a plurality of small prediction units. A prediction unit may have various sizes and shapes, and particularly, the shape of the prediction unit may be a two-dimensional geometrical figure such as a rectangular shape, a square shape, a trapezoid shape, a triangular shape, a pentagonal shape, etc.

A prediction unit partition may mean the shape of a partitioned prediction unit.

A reference picture list may mean a list including at least one reference picture that is used for inter prediction or motion compensation. Types of the reference picture list may be List Combined (LC), List 0 (L0), List 1 (L1), List 2 (L2), List 3 (L3), etc. At least one reference picture list may be used for inter prediction.

An inter-prediction indicator may mean at least one of the inter-prediction direction (one-way directional prediction, bidirectional prediction, etc.) of an encoding/decoding target block in a case of inter prediction, the number of reference pictures used for generating a prediction block by the encoding/decoding target block, and the number of reference blocks used for performing inter prediction or motion compensation by the encoding/decoding target block.

A reference picture index may mean an index of a specific reference picture in the reference picture list.

A reference picture may mean a picture to which a specific unit refers for inter prediction or motion compensation. A reference image may be referred to as the reference picture.

A motion vector is a two-dimensional vector used for inter prediction or motion compensation, and may mean an offset between an encoding/decoding target picture and the reference picture. For example, (mvX, mvY) may indicate the motion vector, mvX may indicate a horizontal component, and mvY may indicate a vertical component.

A motion vector candidate may mean a unit of a prediction candidate when predicting the motion vector, or may mean a motion vector of the unit.

A motion vector candidate list may mean a list configured by using the motion vector candidate.

A motion vector candidate index may mean an indicator that indicates the motion vector candidate in the motion vector candidate list. The motion vector candidate index may be referred to as an index of a motion vector predictor.

Motion information may mean information including at least one of the motion vector, the reference picture index, the inter-prediction indicator, reference picture list information, the reference picture, the motion vector candidate, and the motion vector candidate index.

A transform unit may mean a basic unit when performing encoding/decoding of a residual signal. For example, inverse transform, quantization, dequantization, encoding/decoding of the transform coefficient, etc. may be performed relative to the transform unit. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling may mean a process of multiplying a factor to a transform coefficient level, and as a result, a transform coefficient may be generated. The scaling may be also referred to as dequantization.

A quantization parameter may mean a value used in scaling the transform coefficient level during quantization and dequantization. Here, the quantization parameter may be a value mapped to a step size of the quantization.

A delta quantization parameter may mean a residual value between a predicted quantization parameter and a quantization parameter of the encoding/decoding target unit.

Scan may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning.

A transform coefficient may mean a coefficient value generated after performing a transform. According to an embodiment of the present invention, the transform coefficient may include a quantized transform coefficient level that is a transform coefficient to which the quantization is applied.

A non-zero transform coefficient may mean a transform coefficient in which a value thereof is not 0, or may mean a transform coefficient level in which a value thereof is not 0.

A quantization matrix may mean a matrix used in quantization and dequantization in order to enhance subject quality or object quality of an image. The quantization matrix may be referred to as a scaling list.

A quantization matrix coefficient may mean each element of a quantization matrix. The quantization matrix coefficient may be referred to as a matrix coefficient.

A default matrix may mean a predetermined quantization matrix that is defined in the encoder and the decoder in advance.

A non-default matrix may mean a quantization matrix that is transmitted/received by a user without being previously defined in the encoder and the decoder.

Based on the above-described descriptions, descriptions of the encoder and the decoder will be disclosed in detail.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

In order to provide high coding efficiency, the encoding apparatus 100 performs a rate-distortion optimization method calculating rate-distortion cost on at least one combination of the size of the coding unit, the prediction mode, the size of the prediction unit, the motion information, the size of the transform unit, etc. The encoding apparatus may select the optimum combination on the basis of the rate-distortion cost from the at least one combination. Generally, the optimum combination is a combination having the lowest rate-distortion cost. The rate-distortion cost may be calculated by the equation as follows.

$$D+\lambda * R \qquad \text{[Equation 1]}$$

In the equation 1, D, which denotes distortion, means an average of the square of difference values (mean square error) between original transform coefficients and reconstructed transform coefficients in the transform block. In the equation 1, R, which denotes a rate, means a bit rate using related context information. R includes bit that is generated when encoding coding parameters of the prediction mode, the motion information, the coded block flag, etc., as well as a transform coefficient. In the equation 1, $\lambda$ means the Lagrangian multiplier.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction signal of an input block of the input picture. The prediction signal, which is a block unit, may be referred to as a prediction block. In addition, after generating the prediction block, the encoding apparatus 100 may encode residuals between the input block and the prediction block. The input picture may be referred to as a current picture that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

When a value of the motion vector is not an integer, the motion prediction unit 111 and the motion compensation unit 112 may generate the prediction block by applying an interpolation filter to a partial region in the reference picture. In order to pertain inter prediction or motion compensation, it is determined based on the coding unit that which inter-prediction and motion compensation method is used among a skip mode, a merge mode, and an AMVP mode. And the inter-prediction or motion compensation is performed depending on the mode.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

According to the probability distribution, the entropy encoding unit 150 may generate the bitstream by performing entropy encoding on values calculated by the quantization unit 140 or on coding parameter values calculated in an encoding process, etc., and may output the bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may perform the entropy encoding by using variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional block form coefficient may be changed into the one-dimensional vector foim by scanning the coefficient of the block with up-right scanning. Depending on both the size of the transform unit and the intra-prediction mode, instead of the up-right scanning, it is possible to use vertical scanning that scans the two-dimensional block form coefficient in a column direction, and horizontal scanning that scans the two-dimensional block form coefficient in a row direction. That is, it is possible to determine which scanning method among the up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one of the intra-prediction mode, the inter-prediction mode, the intra-prediction direction, the motion information, the motion vector, reference picture index, the inter-prediction direction, the inter-prediction indicator, the reference picture list, the motion vector predictor, the merge candidate, the type of transform, the size of transform, the information about whether or not an additional transform is used, the filter information within a loop, the information about whether or not a residual signal is present, the quantization parameter, the context model, the transform coefficient, transform coefficient level, the coded block pattern, the coded block flag, the image display/output order, the slice information, the tile information, the picture type, the information about whether or not the merge mode is used, the information about whether or not the skip mode is used, the block size, the block depth, the block partition information, the unit size, the unit depth, and the value of the unit partition information, etc. or the statistics thereof or both.

The residual signal may mean the difference between the original signal and the prediction signal. The residual signal may mean the difference between the original signal and the prediction signal. In addition, the residual signal may be a signal generated by transforming the difference between the original signal and the prediction signal. In addition, the residual signal may be a signal generated by transforming and quantizing the difference between the original signal and the prediction signal. The residual block may be the residual signal, which is a block unit. In addition, the residual signal may be a signal generated by transforming the difference between the original signal and the prediction signal. In addition, the residual signal may be a signal generated by transforming and quantizing the difference between the original signal and the prediction signal.

When the encoding apparatus 100 performs encoding by using inter prediction, the encoded current picture may be used as a reference picture for another image(s) that will be processed thereafter. Therefore, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel when performing vertical filtering and horizontal filtering.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset correction in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied may be transmitted to each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
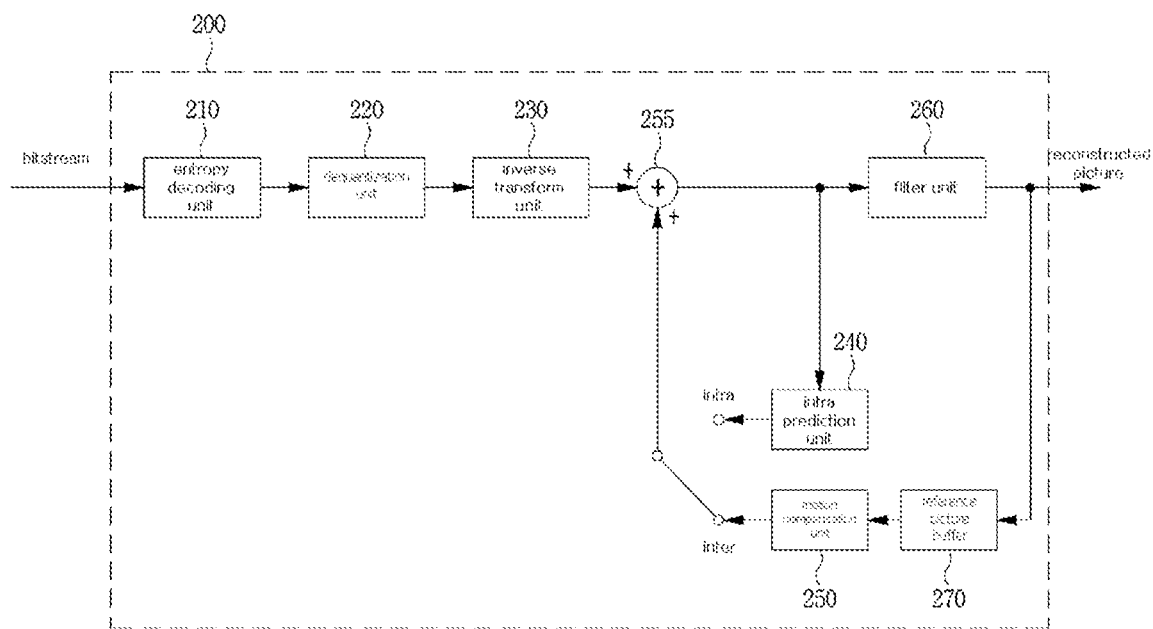
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may change the one-dimensional vector form coefficient into the two-dimensional block form by using the transform coefficient scanning method. For example, the one-dimensional vector form coefficient may be changed into a two-dimensional block form by scanning the coefficient of the block with up-right scanning. Depending on both the size of the transform unit and the intra-prediction mode, instead of up-right scanning, it is possible to use vertical scanning and horizontal scanning. That is, it is possible to determine which scanning method among the up-right scanning, the vertical direction scanning, and the horizontal direction scanning is used depending on the size of the transform unit and the intra-prediction mode. The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, it is possible to determine on the basis of the coding unit which the motion compensation method of a prediction unit in the coding unit is used among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may be not adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of refIdx=0 or the last position) within the reference picture list for the decoding target block. In addition, it is possible to be variably positioned within the reference picture list, and to this end, it is possible to signal the reference picture index indicating a position of the current picture.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
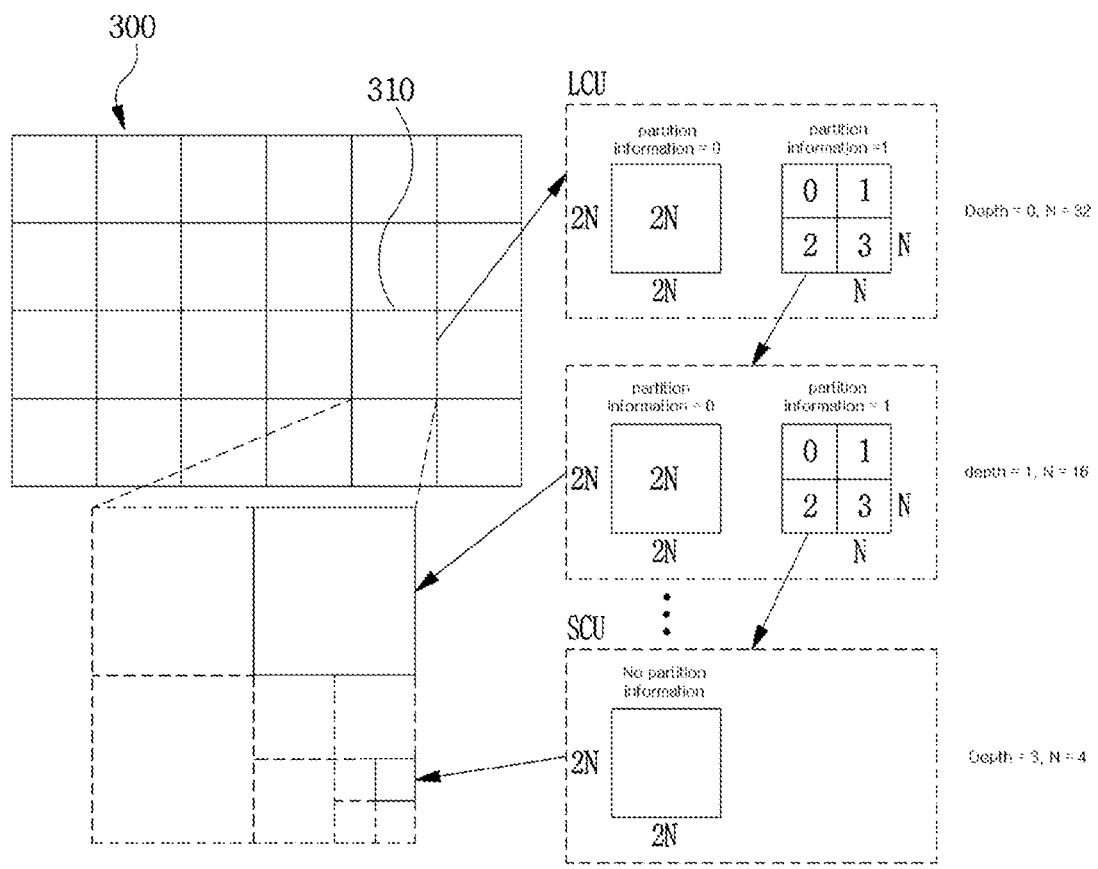
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. A unit may be a combination of 1) a syntax element; and 2) a block including image samples. For example, "partition of a unit" may mean "partition of a block relative to a unit". The block partition information may include information about the unit depth. Depth information may indicate the number of time a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may be depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding an image. The distribution may be determined on the basis of whether or not one CU will be partitioned in plural (a positive integer equal to or more than 2 including 2, 4, 8, 16, etc.). A width size and a height size of the partitioned CU may respectively be a half width size and a half height size of the original CU. Alternatively, the width size and the height size of the partitioned CU may be respectively smaller than the width size and the height size of the original CU depending on the number of partitioned units. Likewise, the partitioned CU may be recursively partitioned into a plurality of further partitioned CUs, wherein the further partitioned CU has a width size and a height size smaller than those of the partitioned CU.

Here, the partition of a CU may be recursively performed up to a predetermined depth. Depth information may be information indicating a size of the CU. The depth information may be stored in each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

Referring to FIG. 3, the size of the LCU having a minimum depth of 0 may be 64×64 pixels, and the size of the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be information of 1 bit. The partition information may be included in all CUs other than the SCU. For example, when a value of the partition information is 0, a CU may not be partitioned, and when a value of the partition information is 1, a CU may be partitioned.

Figure 4:
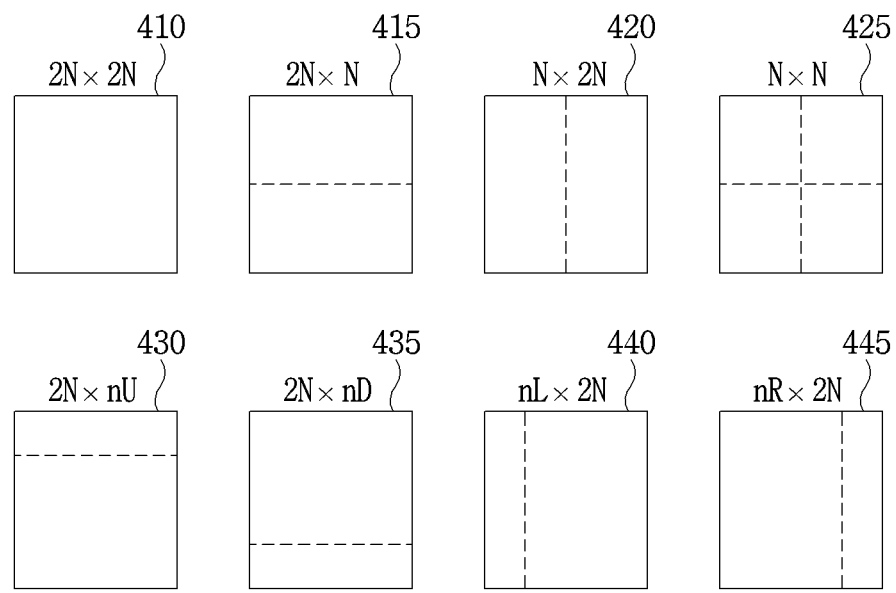
FIG. 4 is a view showing forms of a prediction unit (PU) that may be included in a coding unit (CU).

FIG. 4 is a view showing forms of a prediction unit PU that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

As shown in FIG. 4, in the skip mode, there may not be a partition within the CU. In the skip mode, a 2N×2N mode 410 having the same size as a CU may be supported without a partition within the CU.

In the inter mode, 8 partitioned forms may be supported within a CU, for example, the 2N×2N mode 410, a 2N×2N mode 415, an N×2N mode 420, an N×N mode 425, a 2N×nU mode 430, a 2N×nD mode 435, an nL×2N mode 440, and an nR×2N mode 445. In the intra mode, the 2N×2N mode 410 and the N×N mode 425 may be supported.

Figure 5:
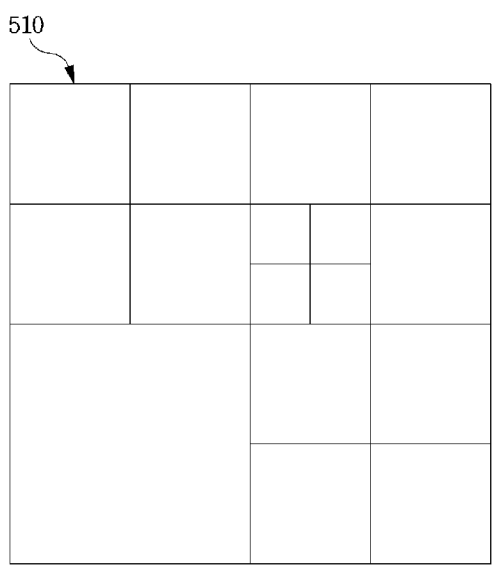
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for a transform, quantization, a reverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. Through the partitioning, one CU 510 may be formed of TUs having various sizes. In addition, one CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into asymmetrical TUs, information of a size/shape of the TU may be signaled, or may be derived from information of a size/shape of the CU.

When performing a transform, the residual block may be transformed by using at least one of predetermined transform methods. For example, the predetermined transform methods may include a discrete cosine transform (DCT), a discrete sine transform (DST), a Karhunen-Loeve transform (KLT), etc. A transformation method that is used for transforming the residual block may be determined by using at least one of inter-prediction mode information of the prediction unit, intra-prediction mode information of the prediction unit, and size/shape of the transform block. When the transformation method is determined, information indicating the transformation method may be signaled.

Figure 6:
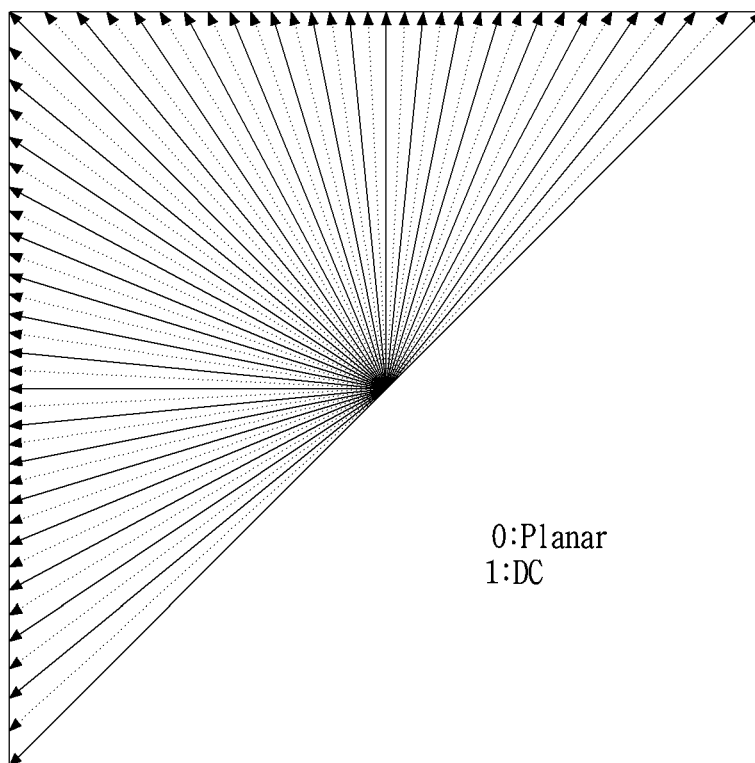
FIG. 6 is a view for explaining an embodiment of a process of intra prediction.

FIG. 6 is a view for explaining an embodiment of a process of intra prediction.

The number of intra-prediction modes may vary depending on a size of the prediction unit (PU), or may be fixed to number N regardless of the size of the prediction unit. Here, the number N may be 35 and 67, or may be a positive integer equal to or more than 1. For example, as shown in FIG. 6, a predetermined intra-prediction mode of the encoder/decoder may include 2 non-directional modes and 65 directional modes. The 2 non-direction modes may include a DC mode and a planar mode.

The number of the intra-prediction modes may vary depending on a type of color component. For example, the number of the intra-prediction modes may vary depending on whether the color component is a luma signal or a chroma signal.

The PU may have a square shape having an N×N or a 2N×2N size. The N×N size may include 4×4, 8×8, 16×16, 32×32, 64×64, 128×128, etc. In addition, the PU may have an M×N size. Here, M and N may be a positive integer equal to more than 2, M and N may be different numbers. The PU may have at least one size of the CU, the PU, and the TU.

Intra encoding or intra decoding or both may be performed by using a sample value in a neighboring reconstructed unit or using a coding parameter.

In intra prediction, a prediction block may be generated after applying a reference sample filter to a reference pixel by using at least one of the intra-prediction mode and the size of the encoding/decoding target block. Types of the reference sample filter applied to the reference pixel may differ from each other. For example, the types of the reference sample filter may differ from each other depending on the intra-prediction mode of the encoding/decoding target block, the size/shape of the encoding/decoding target block, a position of the reference pixel, etc. "Types of the reference filter may differ" may mean a case that at least one of a filter coefficient of the reference sample filter, the number of filter taps, filter strength, or the number of filtering processes is different.

In order to perform an intra-prediction method, an intra-prediction mode of a current prediction unit may be predicted from an intra-prediction mode of a neighboring prediction unit that is adjacent to the current prediction unit. In a case of predicting the intra-prediction mode of the current prediction unit by using mode information predicted from the neighboring intra-prediction mode, when the current prediction unit and the neighboring prediction unit have the same intra-prediction mode, information that the current prediction unit and the neighboring prediction unit have the same intra-prediction mode may be transmitted by using predetermined flag information. When the intra-prediction mode of the current prediction unit is different from the intra-prediction mode of the neighboring prediction unit, intra-prediction mode information of the encoding/decoding target block may be encoded by performing entropy encoding.

Figure 7:
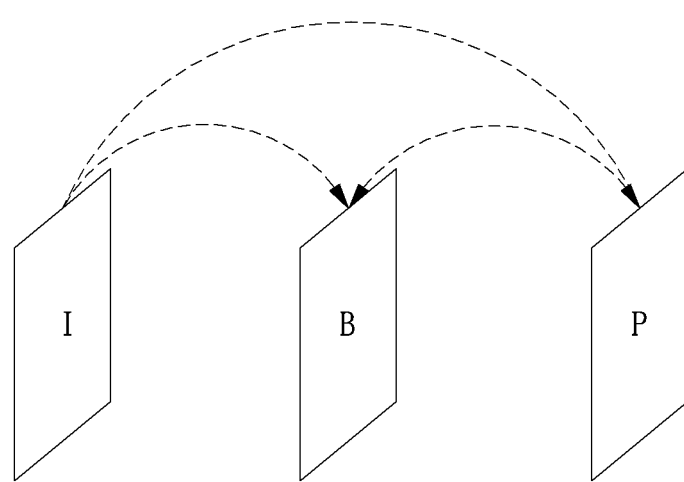
FIG. 7 is a view for explaining an embodiment of a process of inter prediction.

FIG. 7 is a view for explaining an embodiment of a process of inter prediction.

A rectangle shown in FIG. 7 may indicate an image (or a picture). In addition, an arrow of FIG. 7 may indicate a prediction direction. That is, images may be encoded or decoded or both according to prediction directions. Each image may be classified into an I-picture (Intra picture), a P-picture (Uni-predictive Picture), a B-picture (Bi-predictive Picture), etc. according to encoding types. Each picture may be encoded and decoded depending on an encoding type of each picture.

When an image, which is an encoding target, is an I-picture, the image itself may be intra encoded without inter prediction. When an image, which is an encoding target, is a P-picture, the image may be encoded by inter prediction or motion compensation using a reference picture only in a forward direction. When an image, which is an encoding target, is a B-picture, the image may be encoded by inter prediction or motion compensation using reference pictures in both a forward direction and a reverse direction. Alternatively, the image may be encoded by inter prediction or motion compensation using a reference picture in at least one of a forward direction and a reverse direction. Here, when an inter-prediction mode is used, the encoder may perform inter prediction or motion compensation, and the decoder may perform motion compensation in response to the encoder. Images of the P-picture and the B-picture that are encoded or decoded or both by using a reference picture may be regarded as an image for inter prediction.

Hereinafter, inter prediction according to an embodiment will be described in detail.

Inter prediction or motion compensation may be performed by using both a reference picture and motion information. In addition, inter prediction may use the above described skip mode.

The reference picture may be at least one of a previous picture and a subsequent picture of a current picture. Here, inter prediction may predict a block of the current picture depending on the reference picture. Here, the reference picture may mean an image used in predicting a block. Here, an area within the reference picture may be specified by using a reference picture index (refIdx) indicating a reference picture, a motion vector, etc.

Inter prediction may select a reference picture and a reference block relative to a current block within the reference picture. A prediction block of the current block may be generated by using the selected reference block. The current block may be a block that is a current encoding or decoding target among blocks of the current picture. The reference block may mean a reconstruction signal of a block unit within an encoded/decoded reference picture. The reference block may mean a residual signal or a prediction signal of a block unit within an encoded/decoded reference picture.

Motion information may be derived from a process of inter prediction by the encoding apparatus 100 and the decoding apparatus 200. In addition, the derived motion information may be used in performing inter prediction. Here, the encoding apparatus 100 and the decoding apparatus 200 may enhance encoding efficiency or decoding efficiency or both by using motion information of a reconstructed neighboring block or motion information of a collocated block (col block) or both. The col block may be a block relative to a spatial position of the encoding/decoding target block within a collocated picture (col picture) that is previously reconstructed. The reconstructed neighboring block may be a block within a current picture, and a block that is previously reconstructed through encoding or decoding or both. In addition, the reconstructed block may be a block adjacent to the encoding/decoding target block or a block positioned at an outer corner of the encoding/decoding target block or both. Here, the block positioned at the outer corner of the encoding/decoding target block may be a block that is vertically adjacent to a neighboring block which is horizontally adjacent to the encoding/decoding target block. Alternatively, the block positioned at the outer corner of the encoding/decoding target block may be a block that is horizontally adjacent to a neighboring block which is vertically adjacent to the encoding/decoding target block.

The encoding apparatus 100 and the decoding apparatus 200 may respectively determine a block that exists at a position spatially relative to the encoding/decoding target block within the col picture, and may determine a predefined relative position on the basis of the determined block. The predefined relative position may be an inner position or an outer position or both of a block that exists at a position spatially relative to the encoding/decoding target block. In addition, the encoding apparatus 100 and the decoding apparatus 200 may respectively derive the col block on the basis of the determined predefined relative position. Here, the col picture may be one picture of at least one reference picture included in the reference picture list. A method of deriving the motion information may vary according to a prediction mode of the encoding/decoding target block. For example, a prediction mode being applied for inter prediction may include an advanced motion vector prediction (AMVP), a merge mode, etc. Here, the merge mode may be referred to as a motion merge mode.

For example, when AMVP is applied as the prediction mode, the encoding apparatus 100 and the decoding apparatus 200 may respectively generate a motion vector candidate list by using a motion vector of the reconstructed neighboring block or a motion vector of the col block or both. The motion vector of the reconstructed neighboring block or the motion vector of the col block or both may be used as motion vector candidates. Here, the motion vector of the col block may be referred to as a temporal motion vector candidate, and the motion vector of the reconstructed neighboring block may be referred to as a spatial motion vector candidate.

The encoding apparatus 100 may generate a bitstream, and the bitstream may include a motion vector candidate index. That is, the encoding apparatus 100 may generate a bitstream by entropy encoding the motion vector candidate index. The motion vector candidate index may indicate an optimum motion vector candidate that is selected from motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index from the bitstream, and may select a motion vector candidate of a decoding target block among the motion vector candidates included in the motion vector candidate list by using the entropy decoded motion vector candidate index.

The encoding apparatus 100 may calculate a motion vector difference (MVD) between the motion vector and the motion vector candidate of the decoding target block, and may entropy encode the MVD. The bitstream may include the entropy encoded MVD. The MVD may be transmitted from the encoding apparatus 100 to the decoding apparatus 200 through the bitstream. Here, the decoding apparatus 200 may entropy decode the received MVD from the bitstream. The decoding apparatus 200 may derive a motion vector of the decoding target block through a sum of the decoded MVD and the motion vector candidate.

The bitstream may include a reference picture index indicating a reference picture, etc., and a reference picture index may be entropy encoded and transmitted from the encoding apparatus 100 to the decoding apparatus 200 through the bitstream. The decoding apparatus 200 may predict a motion vector of the decoding target block by using motion information of neighboring blocks, and may derive the motion vector of the decoding target block by using the predicted motion vector and the motion vector difference. The decoding apparatus 200 may generate the prediction block of the decoding target block on the basis of the derived motion vector and reference picture index information.

As another method of deriving the motion information, a merge mode is used. The merge mode may mean a merger of motions of a plurality of blocks. The merge mode may mean application of motion information of one block to another block. When the merge mode is applied, the encoding apparatus 100 and the decoding apparatus 200 may respectively generate a merge candidate list by using motion information of the reconstructed neighboring block or motion information of the col block or both. The motion information may include at least one of 1) the motion vector, 2) the reference picture index, and 3) the inter-prediction indicator. A prediction indicator may indicate a uni-direction (L0 prediction, L1 prediction) or a bi-direction.

Here, the merge mode may be applied to each CU or each PU. When the merge mode is performed at each CU or each PU, the encoding apparatus 100 may generate a bitstream by entropy decoding predefined information, and may transmit the bitstream to the decoding apparatus 200. The bitstream may include the predefined information. The predefined information may include 1) a merge flag that is information indicating whether or not the merge mode is performed for each block partition; and 2) a merge index that is information to which a block among the neighboring blocks adjacent to the encoding target block is merged. For example, neighboring blocks adjacent to the encoding target block may include a left neighboring block of the encoding target block, an upper neighboring block of the encoding target block, a temporally neighboring block of the encoding target block, etc.

The merge candidate list may indicate a list storing motion information. In addition, the merge candidate list may be generated in advance of performing the merge mode. The motion information stored in the merge candidate list may be at least one of motion information of the neighboring block adjacent to the encoding/decoding target block, motion information of the collocated block relative to the encoding/decoding target block in the reference picture, motion information newly generated by a combination of motion information that exists in the merge motion candidate list in advance, and a zero merge candidate. Here, motion information of the neighboring block adjacent to the encoding/decoding target block may be referred to as a spatial merge candidate. Motion information of the collocated block relative to the encoding/decoding target block in the reference picture may be referred to as a temporal merge candidate.

A skip mode may be a mode applying the mode information of the neighboring block itself to the encoding/decoding target block. The skip mode may be one of modes used for inter prediction. When the skip mode is used, the encoding apparatus 100 may entropy encode information about motion information of which block is used as motion information of the encoding target block, and may transmit the information to the decoding apparatus 200 through a bitstream. The encoding apparatus 100 may not transmit other information, for example, syntax element information, to the decoding apparatus 200. The syntax element information may include at least one of motion vector difference information, a coded block flag, and a transform coefficient level.

Figure 8:
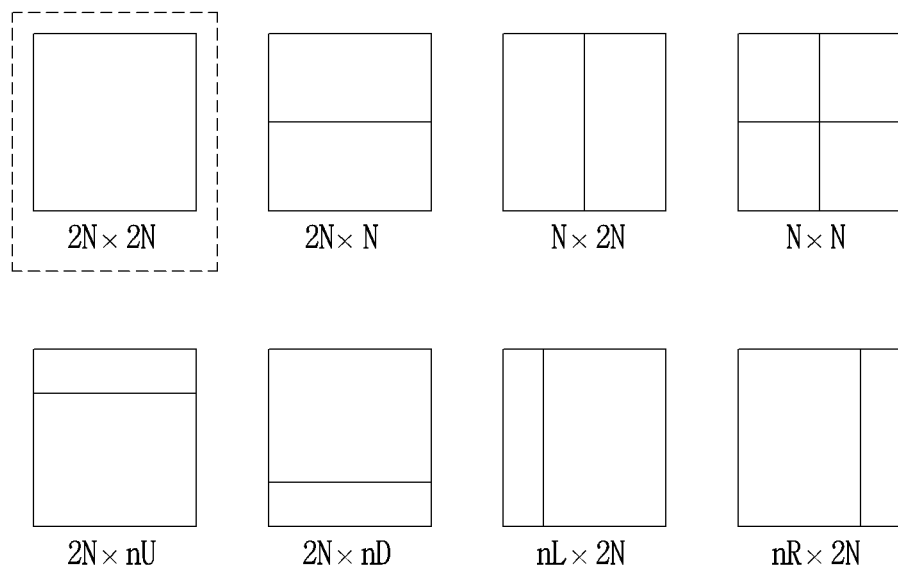
FIG. 8 is a view showing an example of partition modes in an inter-prediction mode.

In inter prediction, the maximum number N (N is positive integer equal to or greater than 1) of partitioned shapes may be supported relative to a current encoding/decoding target block (2N×2N). FIG. 8 is a view showing an example of partition modes in an inter-prediction mode. As shown in FIG. 8, 8 partition modes such as a 2N×2N mode, a 2N×N mode, a N×2N mode, a N×N mode, a 2N×nU mode, a 2N×nD mode, a nL×2N mode, and a nR×2N mode may be supported in the inter-prediction mode. Only, the N×N prediction mode may be supported when the minimum size of a coding block that is set by the encoder/decoder is greater than 8×8.

The encoder may perform a motion prediction on each of the partition modes, and may determine the optimum prediction partition mode of a current block according to the rate-distortion optimization method.

Figure 9:
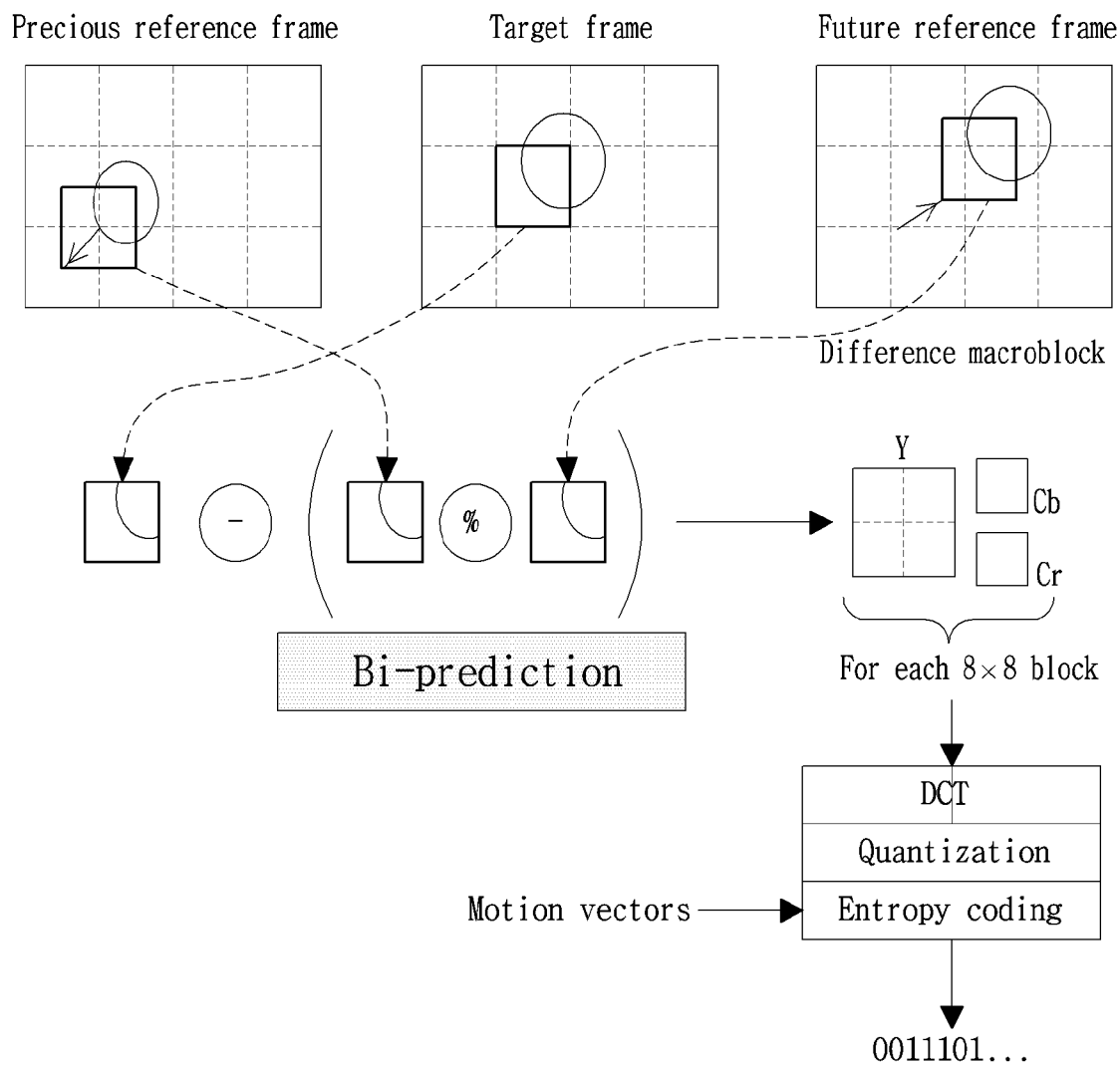
FIG. 9 is a view for explaining a concept of encoding an image by bidirectional prediction.

In addition, in inter prediction, bidirectional prediction (Bi-prediction) may be supported. FIG. 9 is a view for explaining a concept of encoding an image by bidirectional prediction.

As shown in FIG. 9, a prediction block of the current block may be determined on the basis of reference blocks of a previous reference frame and of a future reference frame. Depending on the determined reference blocks, reference picture list information, reference picture index information, and a motion vector may be encoded.

In addition, a residual block may be obtained by subtracting a prediction block from an original block of the current block, and transform and quantization may be performed on the obtained residual block, and the transformed and quantized residual block may be encoded.

Hereinafter, an inter-prediction method according to an embodiment of the present invention will be described in detail with reference to the accompanying drawings.

Figure 10:
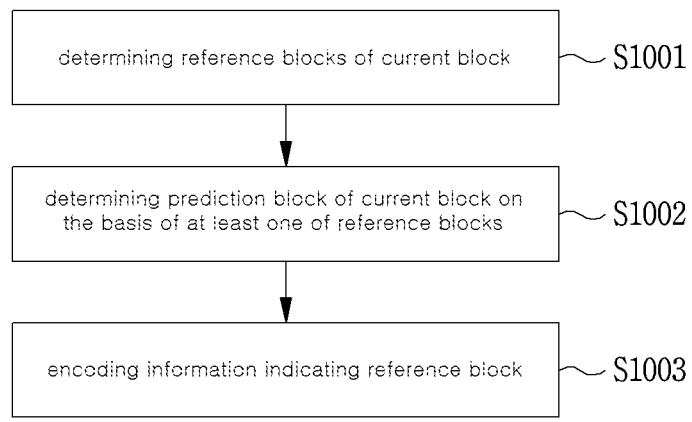
FIG. 10 is a flowchart showing a process of inter-prediction encoding according to an embodiment of the present invention.

FIG. 10 is a flowchart showing a process of inter-prediction encoding according to an embodiment of the present invention.

First, in order to perform bidirectional prediction on a current coding block, at least two reference blocks may be determined at step S1001. A reference block may be obtained from a reference picture list through a motion prediction on a current block. For convenience of description, in the following embodiments, it is assumed that bidirectional prediction on a current block may be performed through both a reference block obtained from a List-0 reference picture and a reference block obtained from a List-1 reference picture. Here, the reference block obtained from the List-0 reference picture is referred to as an L0 reference block, and the reference block obtained from the List-1 reference picture is referred to as an L1 reference block, and an average value of reference blocks obtained from reference pictures (namely, an average value of the L0 reference block and the L1 reference block) is referred to as a bidirectional reference block (Bi reference block).

Second, the encoder may determine a prediction block of a current coding block on the basis of at least one of the L0 reference block, the L1 reference block or the bidirectional reference block according to the rate-distortion optimization method at step S1002. That is, a reference block of at least one of the L0 reference block, the L1 reference block, and the bidirectional reference block may be used as a candidate block for inter prediction of a current block.

For example, one of the L0 reference block, the L1 reference block, and the bidirectional reference block may be determined as a prediction block of the current block.

However, when generating the prediction block by using only one of the L0 reference block, the L1 reference block, and the bidirectional reference block, enhancing encoding/decoding efficiency is limited. Therefore, the encoder may determine a prediction block of a current block by using a plurality of reference blocks among the L0 reference block, the L1 reference block, or the bidirectional reference block.

Specifically, the encoder may determine a prediction block of a current coding block by using a weighted sum of at least two reference blocks among the L0 reference block, the L1 reference block, and the quantization reference block.

For example, the prediction block of the current coding block may be determined by using a weighted sum of the L0 reference block and the bidirectional reference block (an initial bidirectional reference block is an average of the L0 reference block and the L1 reference block). For example, the prediction block of the current coding block may be determined by using a weighted sum of the L1 reference block and the bidirectional reference block (an initial bidirectional reference block is an average of the L0 reference block and the L1 reference block). For example, the prediction block of the current coding block may be determined by using a weighted sum of the L0 reference block, the L1 reference block, and the bidirectional reference block (an initial bidirectional reference block is an average of the L0 reference block and the L1 reference block).

When two reference block candidates are selected, a prediction block may be determined by using the following equation 2.

$$P[x]=(1-w)*P0[x+v0]+w*P1[x+v1] \quad [\text{Equation 2}]$$

In the equation 2, P[x] means a prediction block of a current coding block, and w indicates a weighted value. P0[x+v0] indicates one of candidate reference blocks, P1[x+v1] indicates another one of the candidate reference blocks, v0 and v1 respectively indicate motion vectors of a reference picture list L0 and a reference picture list L1.

Third, the encoder may encode information (index) indicating a candidate block that is used in adaptively deriving a prediction block of a current coding block among candidate reference blocks at step S1003. When a prediction block of a current block is determined by applying a weighting to a plurality of candidate blocks, information of a weighted value may be encoded. In addition, the encoder may encode list information, reference picture index information, motion vector information, and a residual signal depending on the determined reference block.

Information about whether or not a plurality of candidate blocks are used in generating a prediction block of a current block may be explicitly or implicitly encoded. For example, information about whether or not a plurality of candidate blocks are used may be entropy encoded, or derived to the same set at the encoder/decoder. When a plurality of candidate blocks is used to generate a prediction block of a current block, information (index) indicating a candidate block may be encoded as much as the number of reference blocks that are used in generating the prediction block of the current block.

Information of a weighted value may be signaled by a predetermined region. Here, the predetermined region may mean a coding unit or a higher level (for example, slice) than the coding unit. When a plurality of prediction blocks are included within a predetermined region including a current block, the entire or a portion of an inter-prediction block of the predetermined region may share information of a weighted value being signaled. Alternatively, information of a weighted value may be signaled by each prediction unit.

Information of a weighted value may be defined as an index specifying one of a plurality of weighted candidates of a weighted candidate set. The weighted candidate set may be predefined for the encoder/decoder, or may be derived from a weighted value used in at least one of an encoded/decoded block before the current block, a spatial neighboring block, or a temporal neighboring block. The spatial neighboring block is spatially adjacent to a current block, and may be encoded/decoded before the current block. For example, the spatial neighboring block may include at least one of blocks adjacent to the top, the left, or the corner of the current block. The temporal neighboring block may mean a block that is included in a picture positioned at a time zone different from a current block. For example, the temporal neighboring block may mean at least one of a block including the central pixel of a current block and a block including corner pixels of a current block. The number/type of weighted candidates may be fixed by being predetermined to the encoder/decoder, or may be variably determined on the basis of the coding parameter. For example, the number/type of the weighted candidates may be adaptively determined on the basis of at least one of the inter-prediction mode, types of a reference picture (short-term, long-term), or the size/shape of the current block (a square shape, a rectangular shape, an asymmetrical shape, etc.). The weighted candidates may have the same signs, and alternatively, some of the weighted candidates may have signs different from signs of the remaining weighted candidates. The size (absolute) of at least one of the weighted candidates may be greater than 1.

A weighted candidate set defined at the encoder and the decoder will be described as follows.

set 0: (0, 1/4, 1/3, 1/2, 2/3, 3/4, 1)
set 1: (−1/4, 1/4, 3/8, 1/2, 5/8, 3/4, 5/4)

In this case, information of a weighted value may include both information indicating the weighted candidate set and information indicating one weighted candidate in the weighted candidate set.

When performing entropy encoding/decoding on at least one of information of a weighting and information (index) indicating a candidate block that is used in adaptively deriving a prediction block of a current block, at least one of the following binarization methods may be used.

a truncated rice binarization method
a K-th order Exp_Golomb binarization method
a restricted K-th order Exp_Golomb binarization method
a fixed-length binarization method
a unary binarization method
a truncated unary binarization method The decoder may obtain a prediction block of a current decoding block through a reverse process of the above described description. Descriptions thereof will be described with reference to FIG. 11.

Figure 11:
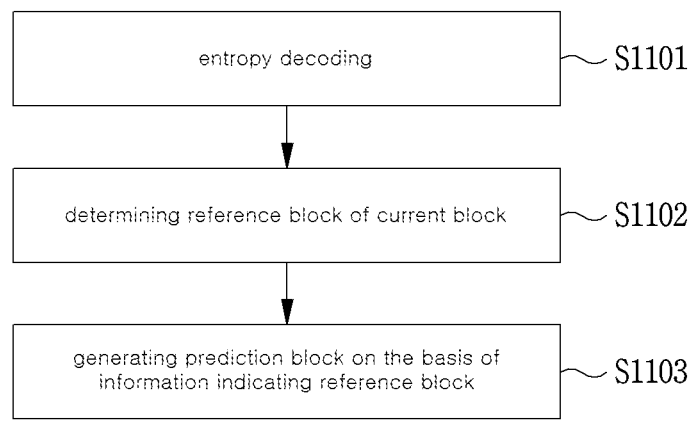
FIG. 11 is a flowchart showing a process of inter-prediction decoding according to an embodiment of the present invention.

FIG. 11 is a flowchart showing a process of inter-prediction decoding according to an embodiment of the present invention.

First, the decoder may perform entropy decoding on information for decoding a prediction block of a current decoding block at step S1101. Here, information for decoding a prediction block may include at least one of reference picture list information, reference picture index information, motion vector information, information indicating a candidate block, information of a weighted value, and information about whether or not a plurality of candidate blocks are used.

Information for decoding a prediction block of a current decoding block may be derived from a previously decoded block or a previously decoded picture. For example, at least one of reference picture list information, reference picture index information, motion vector information, information indicating a candidate block, information of a weighted value, and information about whether or not a plurality of candidate blocks are used may be derived from a spatial neighboring block or a temporal neighboring block of a current decoding block.

The reference picture list information and the reference picture index information may be used in specifying a reference picture of a current decoding block. In addition, the motion vector information may be used in specifying a reference block in a reference picture. For example, at least one of a L0 reference block, a L1 reference block or a bidirectional reference block may be obtained by using the reference picture list information, the reference picture index information, and the motion vector information.

For example, a L0 reference block may be obtained on the basis of both a reference picture index specifying a reference picture in a reference picture list L0 and motion vector information of a L0 reference picture. A L1 reference block may be obtained on the basis of both a reference picture index specifying a reference picture in a reference picture list L1 and motion vector information of a L1 reference picture. When the L0 reference block and the L1 reference block are determined, on the basis of an average value thereof, a bidirectional prediction block may be obtained.

A reference block of a current decoding block may be specified on the basis of reference picture list information, reference picture index information, and motion vector information at step S1102. Prediction block of a current decoding block may be obtained on the basis of information indicating a candidate block at step S1103.

Here, at least one reference block may be selected on the basis of information about whether or not a plurality of candidate blocks are used in generating a prediction block of a current block. For example, when a plurality of candidates are used in generating a prediction block of a current block, entropy decoding may be performed on information indicating a plurality of candidate blocks, and a plurality of reference blocks may be selected on the basis of the information indicating the plurality of candidates.

The information indicating a candidate block may indicate at least one of candidate blocks that may be used in decoding a prediction block of a current decoding block. For example, information indicating a candidate block may indicate at least one of a L0 reference block, a L1 reference block or a bidirectional reference block.

A prediction block of a current block may be generated on the basis of the selected reference block. For example, when one reference block is selected by the information indicating a candidate block, the selected reference block may be derived into a prediction block of a current block.

When a prediction block is decoded by assigning a weighting to a reference block, a prediction block of a current decoding block may be obtained by applying a weighted value to one of candidate blocks. Here, a weighted value may be determined by using a portion of coding parameters. For example, entropy decoding may be performed on a weighted value of a reference block.

Entropy decoding may be performed on information of a weighted value by a predetermined region. Here, the predetermined region may mean a coding unit or a higher level (for example, a slice) than the coding unit. When a plurality of prediction blocks is included in a predetermined region including a current decoding block, the entire or a portion of an inter-prediction block of the predetermined region may share information of a weighted value being signaled. Alternatively, information of a weighted value may be signaled by each prediction unit.

Information of a weighted value may be defined as an index specifying one of a plurality of weighted candidates of a weighted candidate set. The deriving of a weighted value from the weighted candidate set was described with reference to FIG. 10, so the detailed description will be omitted.

When a plurality of reference blocks are selected from a candidate block, a prediction block of a current block may be obtained on the basis of a weighted value as described through the equation 2.

The decoder may finally decode a current block by adding a residual signal to a prediction block obtained at a previous stage.

As shown in FIGS. 10 and 11, a prediction block of a current block is obtained by applying at least one reference block to the current block. According to an embodiment of the present invention, a prediction block of a current block may be obtained by partitioning a current block into sub blocks and applying at least one reference block for each of the sub blocks. Descriptions thereof will be described in detail with reference to FIGS. 12 and 16.

Figure 12:
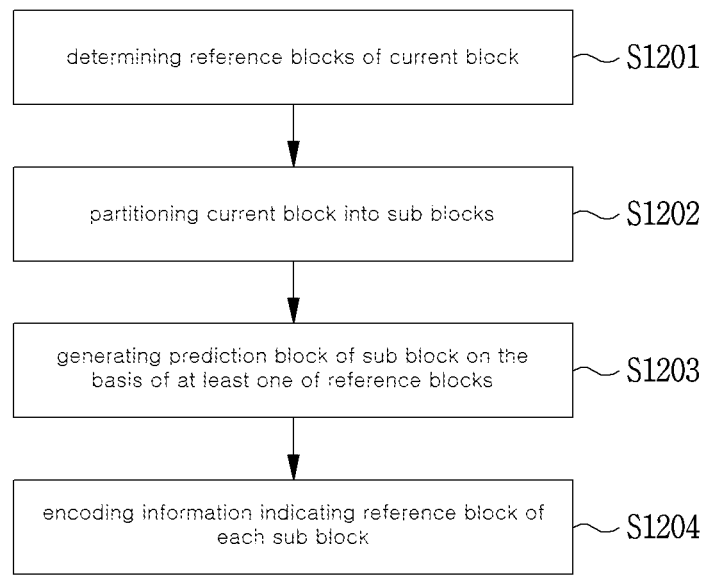
FIG. 12 is a flowchart showing a process of inter-prediction encoding according to an embodiment of the present invention.

FIG. 12 is a flowchart showing a process of inter-prediction encoding according to an embodiment of the present invention.

First, in order to derive a prediction block of a current block, at least one reference block may be obtained at step S1201. For convenience of description, it is assumed that at least one reference block includes a L0 reference block, a L1 reference block, and a bidirectional reference block.

The encoder may partition a current decoding target block into the random number M of sub blocks at step S1202. A prediction block of a current block may be generated by generating the optimum prediction block to each of the sub blocks at step S1203.

For example, a current block is partitioned into the number M (M is positive integer greater than 1) of sub blocks, and a prediction block of a sub block may be generated on the basis of 3 sub reference blocks (a Sub-L0, a Sub-L1, and a Sub-bi) having the same position with a sub block at 3 reference blocks (a L0 reference block, a L1 reference block, and a bidirectional reference block) of each sub block.

For example, when a current block is partitioned into the number M of sub blocks, a prediction block of a random sub block may be determined to one of sub blocks (a Sub-L0, a Sub-L1, and a Sub-bi) in a reference block that is positioned at the same position as the random sub block.

Figure 13:
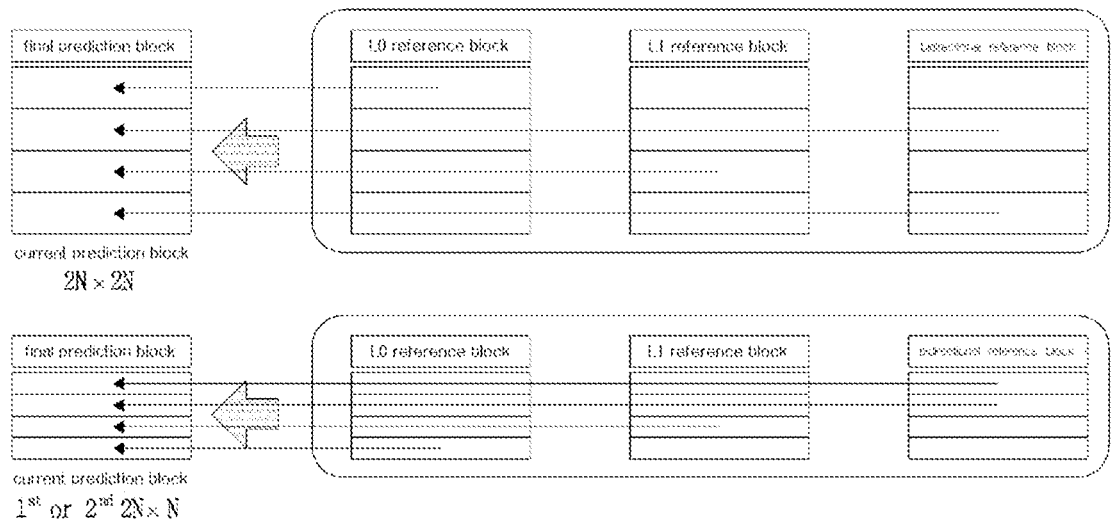
FIG. 13 is a view showing an example of performing inter-prediction on a prediction unit that is partitioned in 2N×2N or 2N×N forms.

FIG. 13 is a view showing an example of performing inter prediction on a prediction unit that is partitioned in 2N×2N or 2N×N forms. As shown in FIG. 13, a current coding block (namely, a prediction block) has the partition number M of 4, and a partition type of a horizontal type.

As shown in FIG. 13, for each sub block, a reference block, which is very similar to each sub block, may be adaptively selected from a L0 reference block, a L1 reference block, and a bidirectional reference block. That is, a prediction block of each sub block may be adaptively used by being one of the L0 reference block, the L1 reference block, and the bidirectional reference block.

Although not shown in the figures, a prediction block of a sub block may be generated by applying a weighting to one of sub blocks of a reference block that is positioned at the same position of a sub block, or may be generated on the basis of a weighted sum of at least two of sub blocks of a reference block that is positioned at the same position of a sub block.

For each sub block, the encoder may select a block having the smallest SAD (sum of absolute differences) or SATD (sum of absolute transform differences) from sub blocks that are positioned at the same positions of a L0 reference block, a L1 reference block, and a bidirectional reference block on the basis of a sub block of a current block. The SAD and the SATD may be calculated in the same manner of a method for calculating distortion of a current HEVC.

The encoder may encode information for generating a prediction block of each sub block at step S1203. In another example, the information for generating a prediction block of each sub block may be implicitly transmitted to the decoder.

Here, the information for generating a prediction block of each sub block may include both information for partitioning a current block into sub blocks and information of a reference block used as a prediction block of each sub block.

The information for partitioning a current block into sub blocks may include information of the partition number M, information (subpart_type) about whether a partition is performed in horizontal or vertical directions, etc. In addition, information of a reference block, which is used as a prediction block of each sub block, may include information (index) indicating at least one of a L0 reference block, a L1 reference block, and a bidirectional reference block, and may further include information of a weighted value when a weighted sum is used during generating a prediction block of each sub block.

At least one of information for partitioning a current block into sub blocks and information of a reference block used as a prediction block of each sub block may be entropy encoded at at least one of a video parameter set, a sequence parameter set, a picture parameter set, an adaptation parameter set, a slice header, a coding unit, a prediction unit, and a transform unit.

When performing entropy encoding/decoding on at least one of the above described information, at least one of the following binarization methods may be used.

a truncated rice binarization method
a K-th order Exp_Golomb binarization method
a restricted K-th order Exp_Golomb binarization method
a fixed-length binarization method
a unary binarization method
a truncated unary binarization method In another example, at least one of information for partitioning a current block into sub blocks and information of a reference block used as a prediction block of each sub block may be implicitly set in the same manner as described above at the encoder/decoder.

Hereinafter, both the information for partitioning a current block into sub blocks and the information of a reference block used as a prediction block of each sub block will be disclosed in detail.

Information of the partition number M may be explicitly or implicitly transmitted. M may be an integer which is exponent of 2, but it is not limited thereto.

A prediction block may be partitioned into the predetermined number thereof according to at least one of a vertical line or a horizontal line, and each of sub blocks may be equally or unequally partitioned. In order to unequally partition a prediction block, information about size/shape of a sub block may be signaled through at least one of, for example, a sequence level, a picture level, a slice level, and a block level.

Depending on a shape of a coding block partitioned into prediction blocks (namely, the prediction unit partition), it is possible to determine whether or not a prediction block is partitioned into sub blocks, the number of sub blocks, or partition shape of a prediction block, etc.

For example, only in a case of 2N×2N, a relevant prediction block is partitioned into the number M of sub blocks, and in a case of not 2N×2N, a prediction mode is partitioned into the number of sub blocks less than the number M. Specifically, in a case of 2N×N and N×2N, the partition number of each prediction block may be M/2.

When partition shapes are 2N×nU, 2N×nD, nL×2N, and nR×2N, partitioning of a sub block may be applied to only a partition having a large region between 2 partitions. Here, a relevant partition may be partitioned into the number M−1 of sub blocks.

Figure 14:
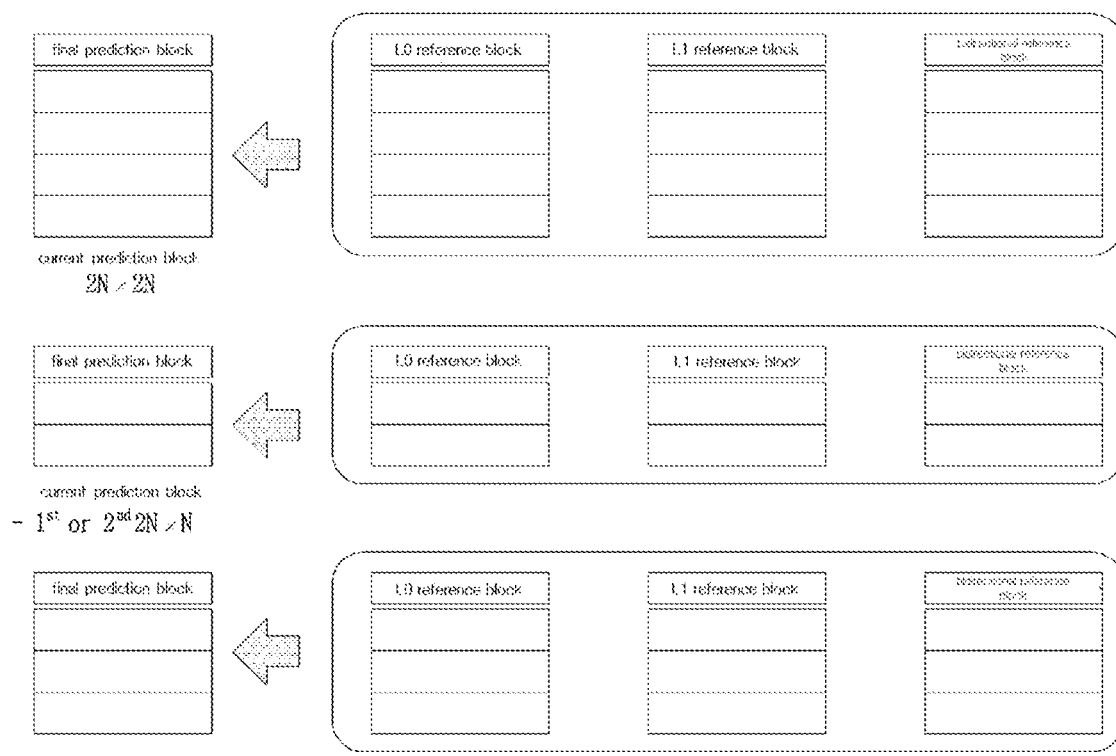
FIG. 14 is a view showing partitioned prediction blocks depending on partition shapes.

FIG. 14 is a view showing partitioned prediction blocks depending on partition shapes.

The number M of sub blocks may be the number that is previously defined according to information obtained through a size of a current prediction block, shape, or a coding parameter. For example, in a case when width and height of a prediction block is respectively W (Width) and H (Height), and supposing a larger value between the W and H is S=Max(W, H), when S is equal to or greater than 32, M is 8, and when S is less than 32, M is 4.

A partition type of a sub block may be also explicitly transmitted or implicitly derived at the encoder/decoder. For example, the partition type of the sub block may be implicitly derived by using information obtained through a coding parameter or using width (W) and height (H) of a current block.

For example, when a shape (namely, the prediction unit partition) of a coding block partitioned into prediction units is not 2N×2N or N×N, a partition type may be determined depending on horizontal/vertical size of a prediction block.

Figure 15:
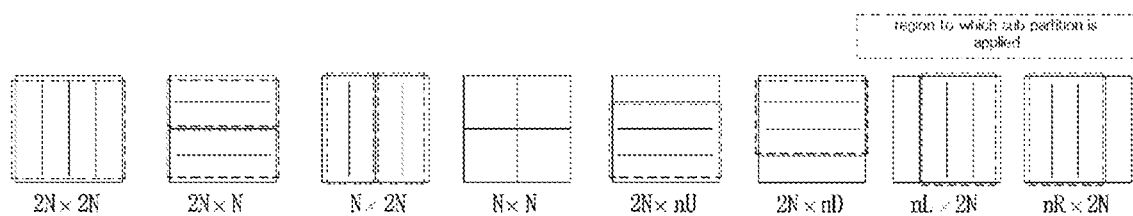
FIG. 15 is a view showing partition shapes of a sub block according to a prediction unit partition.

FIG. 15 is a view showing partition shapes of a sub block according to a prediction unit partition.

A partition expressed as a dotted line of FIG. 15 indicates a region where a sub block is partitioned. Specifically, when width (W) of a current block is larger than height (H) thereof, the current block may be partitioned in a horizontal direction, and in a reverse case, the current block may be partitioned in a vertical direction. Therefore, when the prediction unit partition is 2N×N, 2N×nU, and 2N×nD, a current block may be partitioned in a horizontal direction, and when the prediction unit partition is N×2N, nL×2N, nR×2N, a current block may be partitioned in a vertical direction.

In addition, when the prediction unit partition is 2N×2N, a current block may be horizontally or vertically partitioned by default. When the prediction unit partition is N×N, a current block may not be partitioned.

FIG. 15 shows that each of two partitions are partitioned into sub blocks that are a number equal to or less than the number M when the prediction unit partition of a current block is 2N×N. Unlike the shown example, when the prediction unit partition of a current block is 2N×N, only one (for example, a first partition or a second partition) between two partitions may be partitioned into sub blocks that are a number equal to or less than the number M.

Unlike the shown example, when the prediction unit partition of a current block is N×2N, only one (for example, a first partition or a second partition) between two partitions may be partitioned into sub blocks that are a number equal to or less than the number M.

In addition, when partition shapes are 2N×nU, 2N×nD, nL×2N, and nR×2N, a partition having a small region between 2 partitions may be partitioned into sub blocks.

According to the present invention, M is not fixed to the predetermined number, or a partition type is not limited to horizontal or vertical partition. According to the present invention, the encoder may randomly set the number M, and the number M may be explicitly transmitted or implicitly derived at the encoder/decoder. A partition type of a sub block is determined in a quadrangular shape depending on horizontal or vertical directions, but the partition type may be determined in a random shape, and may be explicitly transmitted or implicitly derived according to the present invention.

Information (index) indicating at least one of a L0 reference block, a L1 reference block, and a bidirectional reference block indicates a reference block used in generating a prediction block of each sub block. For example, when a current encoding target block is partitioned into 4 sub blocks, the optimum prediction block for each sub block may be selected, and information thereof may be encoded.

Although not shown in FIG. 12, the optimum prediction block for one sub block may be determined by using a weighted sum of a plurality of reference blocks. For example, the optimum prediction block for one sub block may be determined by using a weighted sum of 2 reference blocks.

For example, a prediction block of a sub block may be determined on the basis of 2 reference blocks, a weighted sum of a L0 reference block and a bidirectional reference block, a weighted sum of a L1 reference block and a bidirectional reference block, or a weighted sum of a L0 reference block and a L1 reference block.

Figure 16:
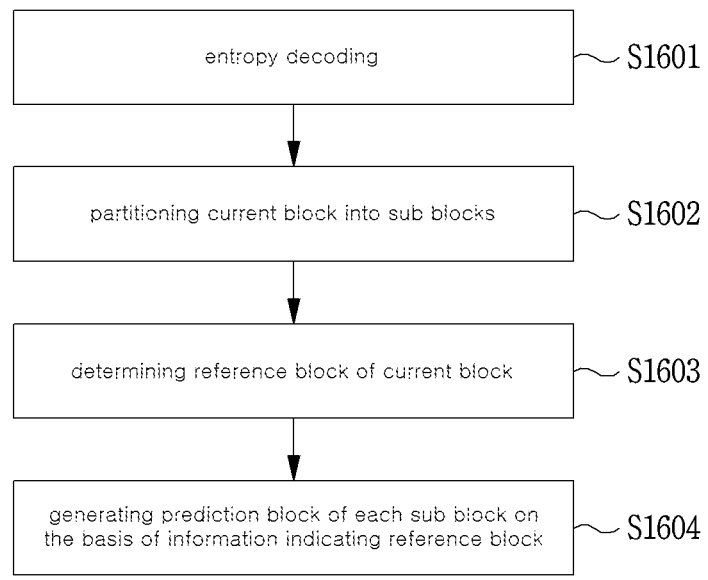
FIG. 16 is a flowchart showing a process of inter-prediction decoding according to an embodiment of the present invention.

FIG. 16 is a flowchart showing a process of inter-prediction decoding according to an embodiment of the present invention.

The decoder may perform entropy decoding on information for decoding a prediction block of a current decoding block at step S1601. Here, the information for decoding the prediction block may include at least one of reference picture list information, reference picture index information, motion vector information, information for partitioning a current block into sub blocks, information of a reference block used as a prediction block of each sub block, and information of a weighted value.

Information for decoding a prediction block of a current decoding block may be derived from a previously decoded block or a previously decoded picture. For example, at least one of the reference picture list information, the reference picture index information, the motion vector information, the information for partitioning a current block into sub blocks, and the information of a reference block used as a prediction block of each sub block may be derived from a spatial neighboring block or a temporal neighboring block of a current decoding block.

The reference picture list information and the reference picture index information may be used in specifying a reference picture of a current decoding block. In addition, the motion vector information may be use in specifying a reference block in a reference picture. For example, at least one of a L0 reference block, a L1 reference block or a bidirectional reference block may be obtained by using the reference picture list information, the reference picture index information and the motion vector information.

For example, a L0 reference block may be obtained on the basis of both a reference picture index specifying a reference picture in a reference picture list L0 and motion vector information of a L0 reference picture. A L1 reference block may be obtained on the basis of both a reference picture index specifying a reference picture in a reference picture list L1 and motion vector information of a L1 reference picture. When the L0 reference block and the L1 reference block are determined, on the basis of an average value thereof, a bidirectional prediction block may be obtained.

A current block may be partitioned into sub blocks on the basis of both information of sub partition number and information of a partition type at step S1602. Here, as described above with reference to FIG. 13, sub partition number M and a partition type may be entropy decoded, or may be derived at the encoder. For example, as shown in FIGS. 14 and 15, when a current block is partitioned into a plurality of sub blocks at the decoder according to the same set of the encoder, the number of sub blocks and partition shape may be determined depending on the prediction unit partition of a current block. Accordingly, when the prediction unit partition of a current block is 2N×2N, the current block may be partitioned into 4 partitions. When the prediction unit partition of a current block is 2N×N, the current block may be partitioned into 2 partitions. In addition, when prediction unit partitions are 2N×N, 2N×nU, and 2N×nD, a current block may be partitioned in a horizontal direction. When prediction unit partitions are N×2N, nL×2N, and nR×2N, a current block may be partitioned in a vertical direction.

A reference block of a current decoding block may be specified on the basis of the reference picture list information, the reference picture index information, and the motion vector information at step S1603. A prediction block of each sub block may be obtained on the basis of information indicating a candidate block of a sub block at step S1604.

Information indicating a candidate block may indicate at least one of a L0 reference block, a L1 reference block or a bidirectional reference block. For example, when information indicating a candidate block indicates one of a L0 reference block, a L1 reference block, and a bidirectional reference block, a sub reference block having the same position of a sub block among blocks being indicated by the information may be determined as a prediction block of a sub block.

A sub reference block may be obtained on the basis of a weighted sum of at least two reference blocks. In this case, entropy decoding may be performed on information of a weighted value of a sub block.

As shown in an example of FIG. 15, assuming a current block is partitioned into sub blocks on the basis of the prediction unit partition, an example of decoding a prediction block for each sub block will be disclosed.

when a current decoding block is in a 2N×2N mode

The decoder may decode the partition number and a partition type of 2N×2N, and index information (for example, 'subpart_idx') indicating the optimum reference block of each sub block. The decoder may obtain a prediction block of a sub block on the basis of a reference block that is selected on the basis of index information. When a prediction block of a sub block is generated and a weighted sum is used, a weighted value is decoded, and a prediction block of a sub block may be generated on the basis of a weighted value.

when a current decoding block is in N×2N or 2N×N modes

The decoder is set to have vertical partition that is an N×2N type partition, and have horizontal partition that is a 2N×N type partition. In addition, partitioning into a number less than a random number M may be performed at the N×2N and 2N×N partitions.

It is possible to decode index information (for example, 'subpart_idx') indicating the optimum reference block for a sub block of each partition, and to obtain a prediction block of a sub block on the basis of a reference block that is selected on the basis of index information. When a prediction block of a sub block is generated and a weighted sum is used, a weighted value is decoded, and a prediction block of a sub block may be generated on the basis of a weighted value.

when a current decoding block is in 2N×nU, 2N×nD, nL×2N, or nR×2N modes

The decoder may perform sub block partitioning into a number less than number M on a partition having a large region between 2 partitions.

Next, it is possible to decode index information (for example, 'subpart_idx') indicating the optimum reference block for a sub block of each partition, and to obtain a prediction block of a sub block on the basis of a reference block that is selected on the basis of index information. When a prediction block of a sub block is generated and a weighted sum is used, a weighted value is decoded, and a prediction block of a sub block may be generated on the basis of a weighted value.

With reference to FIGS. 10 and 11, it is disclosed that a prediction block is obtained without partitioning a current block into sub blocks. With reference to FIGS. 12 and 16, it is disclosed that a prediction block for each sub block is obtained after partitioning a current block into sub blocks.

According to the present invention, the encoder may explicitly or implicitly transmit information about whether or not a current block is partitioned into sub blocks to the decoder. For example, entropy encoding/decoding may be performed on information about whether or not a current block is partitioned into sub blocks, or the information may be derived at the encoder/decoder.

When a current block is not partitioned into sub blocks, a prediction block of a current block may be obtained by the above described embodiment of FIGS. 10 and 11. When a current block is partitioned into sub blocks, a prediction block of a current block may be obtained by the above described embodiment of FIGS. 12 and 16.

For example, when a current block is not partitioned into sub blocks, a prediction block of a current block may be generated by decoding information of a weighted value that is applied to each candidate reference block and information of a candidate reference block that is used in adaptively generating a prediction block of a current block.

When a current block is partitioned into sub blocks, a prediction block of a sub block may be generated after decoding information for generating a prediction block of a sub block.

In the above-described embodiments, the methods are described on the basis of the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The components described in the exemplary embodiments of the present invention may be achieved by at least one of a digital signal processor (DSP), a processor, a controller, an application specific integrated circuit (asic), a programmable logic element such as a field programmable gate array (FPGA), other electronic devices, and combinations thereof. At least one of the functions or the processes described in the exemplary embodiments of the present invention may be achieved by software, and the software may be recorded on a recording medium. Examples of the computer-readable storage medium include magnetic recording media such as hard disks, floppy disks, and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention. Components, functions, processes, etc. according to the embodiments of the present invention may be implemented in the form of a combination of hardware and software.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention is industrially applicable in the industry field of encoding/decoding a video signal.

The invention claimed is:

1. A method for decoding an image, the method comprising:
   determining both a first reference block and a second reference block;
   deriving a prediction block of a current block based on a weighted sum of the first reference block and the second reference block; and
   deriving a reconstruction block of a current block using the prediction block of the current block,
   wherein the weighted sum of the first reference block and the second reference block is calculated by applying a first weight and a second weight to each of the first reference block and the second reference block,
   wherein the second weight is determined by one of weight candidates belonging to a predefined weight candidate set,
   wherein the method further comprises obtaining weight information of the current block from a bitstream,
   wherein the weight information is index information for specifying the second weight in the weight candidate set,
   wherein the weight information is obtained from the bitstream based on a truncated rice binarization method, and
   wherein the first weight is determined based on the second weight.

2. A method for encoding an image, the method comprising:
   determining a first reference block and a second reference block;
   deriving a prediction block of a current block based on a weighted sum of the first reference block and the second reference block; and
   encoding weight information,
   wherein the weighted sum of the first reference block and the second reference block is calculated by applying a first weight and a second weight to each of the first reference block and the second reference block,
   wherein the second weight is determined by one of weight candidates belonging to a predefined weight candidate set,
   wherein the weight information is index for specifying the second weight in the weight candidate set, and the index is encoded based on a truncated rice binarization method, and
   wherein the first weight is determined based on the second weight.

3. A non-transitory computer readable recording medium comprising a bitstream,
   the bitstream comprising:
   information for deriving a first reference block and a second reference block; and
   weight information for deriving a prediction block of a current block,
   wherein the prediction block of the current block is derived based on a weighted sum calculated by applying a first weight value and a second weight value to the first reference block and the second reference block, respectively,
   wherein the weight information is index information for specifying the second weight among weight candidates belonging to a predefined weight candidate set,
   wherein the weight information is encoded based on a truncated rice binarization method, and
   wherein the first weight is determined based on the second weight.

* * * * *